UNITED STATES PATENT OFFICE.

JACOB E. BLOOM, OF THE UNITED STATES ARMY.

MANUFACTURE OF FOOD PREPARATIONS.

No. 800,201. Specification of Letters Patent. Patented Sept. 26, 1905.

Application filed January 15, 1903. Serial No. 139,201.

*To all whom it may concern:*

Be it known that I, JACOB E. BLOOM, a citizen of the United States, and at present a temporary resident of the city of New Orleans, in the parish of Orleans and State of Louisiana, have invented certain new and useful Improvements in the Manufacture of Food Preparations, of which the following is a specification.

This invention is founded largely upon that law of the function of human digestion to the effect that a food is most easily assimilated when its proximate principles or constituents are analogous or approximate to those of the human system which they are intended to replenish or nourish, and in compliance with this law this invention provides a food product wherein the fat content thereof will analogize human fat as regards its olein, palmitin, and stearin, not only in its said ingredients, but in the proportions of said ingredients as well, whereby such fat content will be most readily digested and absorbed and assimilated by the human system, and the waste of energy incident to the digestion of the large proportion of excess stearin or palmitin, or both, as found in ordinary fats, is avoided and such energy rendered available for concentration upon the digestion of the remaining food.

Therefore my improvement has for its primary aim to increase the digestibility of food preparations by the changing of the fat or oil portion to a compound whose constituents of olein, palmitin, and stearin approximate the like constituents of human fat, thereby making the composition more readily assimilated by the human system, and, further, thereby making the composition of the fatty portion of the aliment always liquid through all stages of digestion at the body temperature of about $37\frac{4}{9}°$ centigrade, thus not impeding the digestion of the other portions of the aliment.

The human fat of an adult upon analysis was found to contain about eighty-seven per cent. olein, eight per cent. palmitin, and two per cent. stearin; and that of a child to contain sixty-five per cent. olein, twenty-eight per cent. palmitin, and three per cent. stearin. The remainder comprises minute quantities of caproic, myristic, and other undetermined insoluble fatty acids. The said percentages vary slightly in fats from various parts of the body and in different ages. Thus it contains sixty-five to eighty-seven per cent. olein, the remainder being principally stearin and palmitin, with the palmitin predominating over stearin.

The fat in such food preparations as are prepared by me has the above ingredients and proportions thereof—that is to say, it contains more than sixty-five per cent. olein and its remainder is constituted principally or wholly of palmitin and stearin, with the palmitin in excess of the stearin. Preferably, however, where the food is prepared for adult's use I employ a fat comprising eighty-seven per cent. olein, eight per cent. palmitin, and two per cent. stearin, and when it is prepared for a child's use I employ a fat comprising sixty-five per cent. olein, twenty-eight per cent. palmitin, and three per cent. stearin. I also use at times a fat comprising about seventy-five per cent. olein and twenty-five per cent. palmitin and stearin, the latter two in the ratio as found in the child's or adult's fat aforesaid. These fats in their principal constituents and proportions thereof are thus analogous to human fat, whereby the advantages with regard to digestibility and absorption above specified are obtained.

The fatty portion of foods, whether from the animal or vegetable kingdom, as now commonly eaten are not homogeneous compounds, but consist of certain mixtures of proximate constituents principally of olein, palmitin, and stearin in varying proportions not at all approximating the proportions of olein, palmitin, and stearin found in the human fat. At present in the manufacture of food preparations containing any fats it is the universal practice to use fats without regard to the proportions of olein, palmitin, and stearin in the fat. This is objectionable for the reason that the resulting food preparation is uncertain and generally contains an excess of palmitin or stearin, or both, the digestion of which excess is difficult and slow and distressful, and the energy required to digest and eliminate such excess is detracted from its proper work in the digestion of other elements of the food.

In the carrying of the invention into practical effect with meat preparations I first remove from the meats, preferably prior to the cooking, all visible and tissue fats and substitute for said fat in the food preparation or in the can, if it be a canned preparation, a like amount or any desired amount of artificially-prepared fat having approximately the proportions of olein, stearin, and palmitin existing in the human fat.

Where the food preparation is a mixture of a number of foodstuffs without meats and including the addition of a fat—as, for instance, in the making of a plum-pudding, where the commonly used recipe calls for the addition or incorporation of a stated amount or percentage of suet or other fat—I substitute for such ordinary fat a fat containing the proportions of olein, palmitin, and stearin existing in the human fat. I do not confine or restrict myself to manufacturing the food preparation only as aforesaid, which, however, is the mode I prefer. In some cases I may attain the same result by the addition of olein only or olein and palmitin or only parts of the olein, palmitin, and stearin stated in above formulas. As, for instance, in the manufacture of food preparations of meat only or foods containing large amounts of meats after the cutting away and removal of the visible tissue fats the meats from some parts of the beef may in some cases contain a material amount of invisible fats or oils between the meat fibers and which cannot be cut away. Such concealed fat remnants in meat usually contain stearin and palmitin in the ratio of about three parts of palmitin to one part of olein for such food preparations, as also other food preparations, where the elements contain a material amount of invisible fats and where exact accuracy of the fat composition is a desideratum, as in cases of invalids, I substitute or incorporate in place of the fats removed or excluded and modify the invisible fats by the addition of a fat or oil comprising olein, palmitin, or stearin fats in such amounts that the resulting fat in the whole preparation shall contain or comprise olein, palmitin, and stearin in the approximate proportions only as found in one of the above fat formulæ, the particular formula followed being governed by the proposed use, whether for adult or child. I ascertain the amount of olein, palmitin, and stearin to be added or incorporated in such food preparation in the following manner: I prepare several of the same kind of food preparations in the manner now customary to a skilled cook, canner, or preserver, so as to contain all the elements ordinarily used exclusive of visible flats. I then analyze same for fat only and determine approximately the total amount of fat and the proportions and weights of olein, palmitin, and stearin in an average of said food preparation. I add the differences between the amount of olein and of palmitin and of stearin thus found and that of the amount of olein, palmitin, and stearin in the desired total amount of fat of my fat formula, and where additional fats are desired in the food preparation I add an artificially-prepared fat of said fat formula. The resulting fat in the whole food preparation is then composed of olein, palmitin, and stearin in the proportions of the said formula or as found in human flesh. An analysis once made of several of any particular kind of food preparation, as aforesaid, can be thereafter followed for all such kinds. The amount of fat or oil thus used or added may on account of ease of digestibility be a larger percentage of fats than now ordinarily used.

Where an excess of edible fat added, as aforesaid, would be liquid at ordinary temperature on account of preponderance of olein and where such liquid or oily state would prove objectionable to the palatability of some persons, I jellify or partially solidify the liquid fat by some of the well-known methods, as by adding gelatin thereto, avoiding those using stearin, and use such jellified fat in the food preparation. In making some of my food preparations I add to said destearinized fats from five to six per cent. of free oleic acid or use such of said fats which by artificial decomposition or otherwise have been changed to include five to six per cent. free acids, the object of which is to facilitate in some cases the digestion, emulsification, and absorption of the fats.

Human fat besides containing sixty-five to eighty-seven per cent. olein, contains for the remainder principally palmitin and stearin, the palmitin predominating over the stearin, but also contains a very small amount of myristin, and which latter is also found in nutmegs. The so-called "nutmeg-butter" or "mace-butter" contains about forty-five per cent. of myristin. By adding a small per cent., preferably about one-half per cent., of nutmeg-butter to the above destearinized fat, by melting and stirring same therein, I attain a fat more closely approximating human fat, and use same accordingly in sundry food preparations to meet particular needs and where the taste and odor of nutmegs is desired.

I regard as my preferred species a food whose fat constituent contains olein, palmitin, and stearin in about the proportions of like elements in human fat, to which has been added from five per cent. to six per cent. of free oleic acid, a small percentage (preferably of about one-half per cent.) of nutmeg-butter and a jellifying ingredient sufficient to partially solidify the liquid fat.

For canned or preserved foods I complete the preparation by methods now followed in canning, preserving, hermetic sealing, and sterilizing. For food preparations other than the canned or potted or preserved foods—that is, those intended for immediate consumption—I pursue substantially the methods now pursued therewith modified as aforesaid.

To pursue this method with all foodstuffs will be a material advantage as compared with existing methods, especially in the preparing food products in the industry of canning, preserving, potting, and baking, wherever fats are used.

Among the food preparations to which my improved described method of manufacture is applicable by any one skilled in the art of cooking or of canning and preserving are the following: Any meat preparation, including canned roast or boiled corned beef or mutton, roast or corned beef hash or stew, sausages, mince-meats, deviled meats, potted meats, sardines and other fish, pork and beans, plum-pudding, pies, biscuits, cakes, cereal preparations, confectionery wherever fat is added to sugar or saccharine matter, salads, and salad-dressings.

I am aware that olive-oil, suet, lard, and lard-oil, and kindred well-known oils and fats have been used in preparing in cooking, in potting, and preserving, and in canning food preparations, and I do not claim any such; but none such attain the improvement aforesaid as regards increase of digestibility of the whole food preparation by containing the olein, palmitin, and stearin fats in the proportions aforesaid, thereby constituting a product never before produced.

In a separate application filed by me of even date herewith and serially numbered 139,200 I have described and claimed a fat having a predetermined proportion of olein, palmitin, and stearin, substantially as occurring in human fat, and have also claimed therein, broadly, "a food product containing olein, palmitin, and stearin in approximately the proportions in which the said ingredients occur in human fat."

The present application, it will be observed, is subordinate to the copending application aforesaid in that it relates restrictively to food products containing such a fat and one or more other foodstuffs or ingredients.

Having thus described the invention, what I believe to be new, and desire to secure by Letters Patent, is—

1. The herein-described process of manufacturing food preparations from foodstuffs containing oils or fats to give such food preparations a predetermined content of olein, palmitin and stearin which consists in removing and excluding all visible and tissue fats from the foodstuffs and in adding to the remainder, fat or oil comprising olein, palmitin and stearin in proportions and amounts requisite to bring the olein, palmitin and stearin in the resulting food product into approximately the proportions in which the said proximate principles exist in human fat.

2. The process of manufacturing food preparations from foodstuffs containing oils or fats to give such food preparations a predetermined content of olein, palmitin and stearin which consists in removing oil or fat from said foodstuffs and in adding to the remainder an oil or fat comprising olein, palmitin and stearin in amounts and proportions requisite to bring the olein, palmitin and stearin in the resulting whole food product into approximately the proportions in which the said proximate principles exist in human fat.

3. The process of manufacturing food preparations from foodstuffs containing oils or fats to give such food preparations a predetermined content of olein, palmitin and stearin which consists in removing oil or fat from said foodstuffs and in adding to the remainder a jellifying ingredient and an oil or fat comprising olein, palmitin and stearin in amounts and proportions requisite to bring the olein, palmitin and stearin in the resulting whole food product into approximately the proportions in which the said proximate principles exist in human fat.

4. The process of manufacturing food preparations from foodstuffs containing oils or fats to give such food preparations a predetermined content of olein, palmitin and stearin which consists in removing oil or fat from said foodstuffs and in adding to the remainder, free oleic acid and an oil or fat comprising olein, palmitin and stearin in amounts and proportions requisite to bring the olein, palmitin and stearin in the resulting whole food product into approximately the proportions in which the said proximate principles exist in human fat.

5. The process of manufacturing food preparations from foodstuffs containing oils or fats to give such food preparations a predetermined content of olein, palmitin and stearin which consists in removing oil or fat from said foodstuffs and in adding to the remainder myristin and an oil or fat comprising olein, palmitin and stearin in amounts and proportions requisite to bring the olein, palmitin and stearin in the resulting whole food product into approximately the proportions in which the said proximate principles exist in human fat.

6. The process of manufacturing food preparations from foodstuffs containing oils or fats to give such food preparations a predetermined content of olein, palmitin and stearin which consists in removing oil or fat from said foodstuffs and in adding to the remainder a jellifying ingredient, free oleic acid, myristin and an oil or fat comprising olein, palmitin and stearin in amounts and proportions requisite to bring the olein, palmitin and stearin in the resulting whole food product into approximately the proportions in which the said proximate principles exist in human fat.

7. A food product comprising fatty and non-fatty ingredients and whose total fat content comprises olein, palmitin and stearin in approximately the proportions in which they exist in human fat.

8. A food product comprising fatty and non-fatty ingredients and a jellifying agent and whose total fat content comprises olein, palmitin and stearin in approximately the proportions in which they exist in human fat.

9. A food product comprising fatty and non-fatty ingredients and containing free oleic acid and whose total fat content comprises olein, palmitin and stearin in approximately the proportions in which they exist in human fat.

10. A food product comprising fatty and non-fatty ingredients and containing myristin and whose total fat content comprises olein, palmitin and stearin in approximately the proportions in which they exist in human fat.

11. A food product comprising fatty and non-fatty ingredients and containing a jellifying agent, free oleic acid and myristin and whose total fat content comprises olein, palmitin and stearin in approximately the proportions in which they exist in human fat.

JACOB E. BLOOM.

Witnesses:
  JOSEPH G. PARKINSON,
  ALBERT H. HETTICH.